United States Patent
Sano et al.

(10) Patent No.: US 6,875,252 B2
(45) Date of Patent: Apr. 5, 2005

(54) COPPER POWDER AND PROCESS FOR PRODUCING COPPER POWDER

(75) Inventors: Kazushi Sano, Chikkousakae-machi (JP); Yoshihiro Okada, Okayama (JP); Hiromasa Miyoshi, Okayama (JP); Yoshiomi Takada, Hachioji (JP)

(73) Assignee: Dowa Mining Co., Ltd., Tokyo (JP)

( * ) Notice: Subject to any disclaimer, the term of this patent is extended or adjusted under 35 U.S.C. 154(b) by 61 days.

(21) Appl. No.: 10/216,750

(22) Filed: Aug. 13, 2002

(65) Prior Publication Data

US 2003/0015062 A1 Jan. 23, 2003

Related U.S. Application Data

(62) Division of application No. 09/726,379, filed on Dec. 1, 2000, now abandoned.

(30) Foreign Application Priority Data

Dec. 1, 1999 (JP) ............................. 11-342435

(51) Int. Cl.[7] .................................................. B22F 1/00
(52) U.S. Cl. ........................................................ 75/255
(58) Field of Search ............................................ 75/255

(56) References Cited

U.S. PATENT DOCUMENTS

| | | | | |
|---|---|---|---|---|
| 4,818,280 A | * | 4/1989 | Langner et al. ................ | 75/370 |
| 4,863,510 A | * | 9/1989 | Tamemasa et al. ............ | 75/351 |
| 5,588,983 A | * | 12/1996 | Tani et al. ...................... | 75/354 |
| 5,801,318 A | | 9/1998 | Tani et al. ...................... | 75/373 |
| 6,174,344 B1 | * | 1/2001 | Hayashi et al. ................ | 75/255 |
| 6,379,419 B1 | * | 4/2002 | Celik et al. .................... | 75/346 |
| 6,679,937 B1 | * | 1/2004 | Kodas et al. ................... | 75/365 |

FOREIGN PATENT DOCUMENTS

| JP | 62-99406 | 5/1987 |
|---|---|---|
| JP | 2-197012 | 8/1990 |
| JP | 4-116109 | 4/1992 |

* cited by examiner

Primary Examiner—Ngoclan T. Mai
(74) Attorney, Agent, or Firm—McDermott Will & Emery LLP

(57) ABSTRACT

A copper powder is provided that has an average particle diameter in the range of from not less than 0.1 $\mu$m to less than 1.5 $\mu$m, that has a narrow particle size distribution width whose value A defined by Equation (1) below in terms of X25, X50 and X75 defined below is not greater than 1.2, and that forms a pseudo-fused sintered product when held at a temperature of 800° C. under an atmosphere of inert gas at one atmosphere pressure:

$$A=(X75-X25)/X50 \qquad (1),$$

where X25, X50 and X75 are values of particle diameter X corresponding to Q %=25%, 50% and 75% on a cumulative particle-size curve plotted in an orthogonal coordinate system whose abcissa represents particle diameter X ($\mu$m) and ordinate represents Q % (ratio of particles present of a diameter not greater than the corresponding value of X; expressed in units of vol % of particles). The copper powder is produced by conducting wet reduction of cuprous oxide into metallic copper powder in the presence of ammonia or an ammonium salt. When used to form the terminal electrodes of multi-layer capacitor, it enables the electrodes to form into solid sintered bodies with few pores by sintering at a low temperature.

3 Claims, 5 Drawing Sheets

COPPER POWDER AND PROCESS FOR PRODUCING COPPER POWDER

This application is a divisional of U.S. patent application Ser. No. 09/726,379, filed Dec. 1, 2000, now abandoned.

BACKGROUND OF THE INVENTION

1. Field of the Invention

This invention relates to a process for producing a copper powder that exhibits little agglomeration despite small particle diameter and to a copper powder enabling production of a pore-free sintered product at a low sintering temperature.

2. Background Art

Bonding or fixing conductive circuit members at desired locations on an insulating board is commonly done using a conductive paste. The conductive paste utilizes a powder of copper, nickel, silver or the like as its conductive material. Copper paste is widely used because copper powder is not only inexpensive but also low in electrical resistance and resistant to migration.

Recently it is proposed to form a terminal electrode of multi-layer ceramic capacitors by using an electrical conductive past having a metal powder therein as a filler. In this case, the conductive past is attached to the baked laminated ceramics of an dielectric substance, then heated as a whole at temperatures sufficient to occur the vaporization of vehicle component or the decomposition of the resins of the paste and to sinter the residual metal powder in the past thereby to form a terminal electrode. This conductive paste also generally uses copper powder as its powder component.

Known process of producing copper powder include the mechanical pulverization process, atomization process of spraying molten copper, electrolytic cathode deposition process, vapor deposition process and the wet reduction process. The wet reduction process is the main one used to produce copper powder for conductive paste because it is superior to the others in the point of enabling ready production of particles of uniformly small size. Copper powder production processes using the wet reduction method are taught by, for instance, Japanese Patent Publication JPA No. 4-116109 (1992), JPA No. 2-197012 (1990) and JPA No. 62-99406 (1987).

When the terminal electrodes of multi-layer ceramic capacitors are formed by a copper paste made from conventional copper powder, a sintering temperature higher than 800° C. is generally required to produce high-density conductors. This is because at a temperature of 800° C. or lower, the sintering that occurs, if any, does not integrally bind the particles to a degree sufficient to avoid a sintered body including many pores. It is therefore impossible to obtain good conductors. The need to employ a high sintering temperature exceeding 800° C. (under an inert atmosphere of 1 atmosphere) leads to the following problems.

When heated to a temperature higher than 800° C., multi-layered ceramics are, depending on their material, liable to deteriorate and decrease the capacity by incurring cracks between the ceramics and external electrode based on the shrinkage of the past as to cause mismatch with the ceramics. This restricts the selection of the ceramics material of the stacked boards.

Aside from these quality-related problems, high-temperature sintering is also costly in terms of energy and facility costs since it requires more heating energy, a longer heating period and more expensive heating equipment, thus increasing production cost. It also tends to lower yield.

The object of the present invention is therefore to provide a copper powder enabling production of a solid sintered product with few pores even at a low sintering temperature.

SUMMARY OF THE INVENTION

Through a concentrated study in search of a solution to the aforesaid problem, the inventors succeeded in producing a copper powder that is highly resistant to agglomeration despite its small particle diameter and can therefore be used to produce a pore-free sintered product (called a "pseudo-fused sintered product" in this specification because, at first sight, it appears to have a once-melted-down consistency) even at a sintering temperature of not higher than 800° C. Specifically, the inventors found that in the wet reduction process it is possible to produce small-particle-diameter copper powder of narrow particle-size distribution and smooth particle surface (specific surface area measured by the B.E.T. method being small for the particle diameter) by bringing the suspension into the presence of ammonia or an ammonium salt before or in the course of the secondary reduction, and that the so-obtained copper powder is highly resistant to agglomeration of the particles and therefore suitable for low-temperature sintering.

Thus, the present invention provides a process for producing copper powder comprising a step of reacting an aqueous solution of a copper salt and an alkali to precipitate copper hydroxide, thereby obtaining a suspension containing copper hydroxide, a primary-reduction step conducted in the suspension to reduce the copper hydroxide obtained to cuprous oxide, a secondary-reduction step conducted in the suspension to reduce the cuprous oxide obtained to metallic copper and a step of separating the metallic copper from the suspension, the process characterizing in that the suspension before or in the course of the secondary-reduction step should be contacted with ammonia or an ammoniate.

This process according to the present invention produces a copper powder that has an average particle diameter in the range of from not less than 0.1 $\mu$m to less than 1.5 $\mu$m, that has a narrow particle size distribution width whose value A defined by Equation (1) below in terms of X25, X50 and X75 defined below is not greater than 1.2, and that forms a pseudo-fused sintered product when held at a temperature of 800° C. under an atmosphere of inert gas at one atmosphere pressure;

$$A = (X75 - X25)/X50 \qquad (1),$$

where X25, X50 and X75 are values of particle diameter X corresponding to Q %=25%, 50% and 75% on a cumulative particle-size curve plotted in an orthogonal coordinate system whose abscissa represents particle diameter X ($\mu$m) and ordinate represents Q % (ratio of particles present of a diameter not greater than the corresponding value of X; expressed in units of vol % of particles).

DESCRIPTION OF THE PREFERRED EMBODIMENTS

Figure 1:
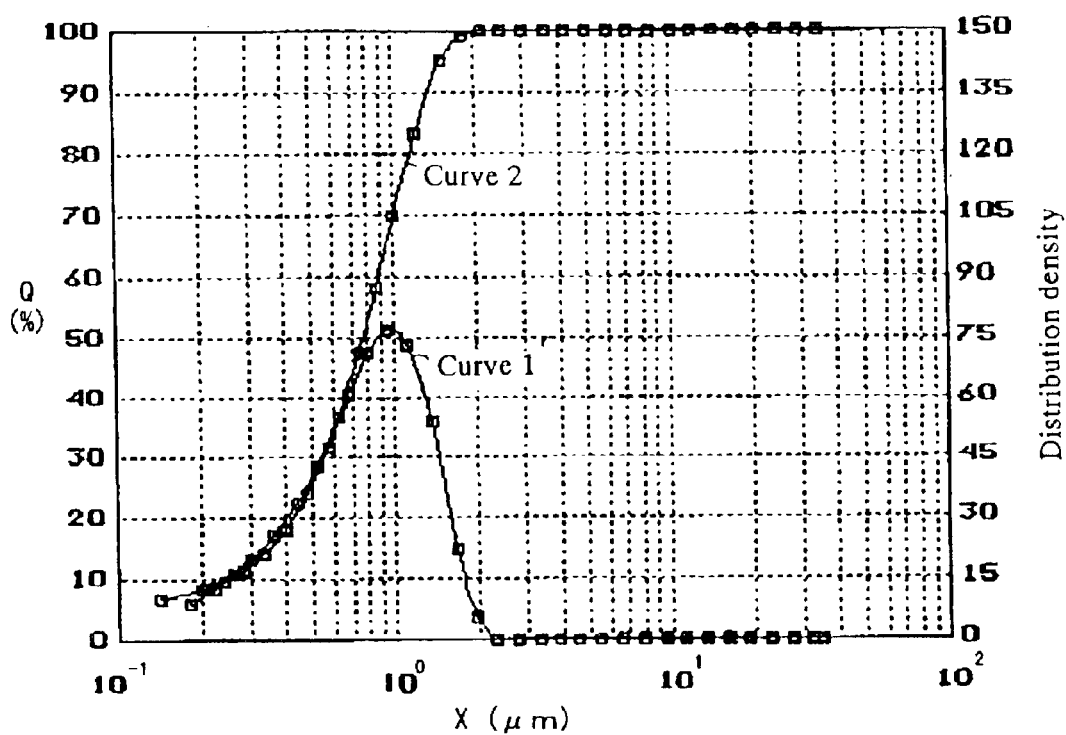
FIG. 1 is a helos particle-size distribution chart of copper powder according to the present invention.

The conventional process of producing copper powder by wet reduction comprises a step of reacting an aqueous solution of a copper salt and an alkali to precipitate copper hydroxide, thereby obtaining a suspension containing copper hydroxide, a primary-reduction step conducted in the suspension to reduce the copper hydroxide obtained to cuprous oxide, and a secondary-reduction step conducted in the suspension to reduce the cuprous oxide obtained to metallic copper. A metallic copper powder can then be obtained by separating the metallic copper obtained from the suspension and drying it, either immediately or after surface treatment for imparting oxidation resistance. However, the inventors discovered that when the reduction in the secondary-reduction step is promoted by presence of ammonia or an ammoniate, a copper powder can be obtained that, even at a small particle diameter of, for instance, not greater than 1.5 μm, preferably not greater than 1.2 μm, more preferably not greater than 1.0 μm, exhibits small B.E.T specific surface area for the particle diameter (has minimal surface irregularity) and narrow particle-size distribution (consists of particles of substantially the same diameter), and further discovered that the copper powder is highly resistant to agglomeration despite its small particle diameter. The inventors also learned that the copper powder forms a pseudo-fused sintered product even when sintered at a low temperature.

The sintering for forming the external electrodes of stacked insulating boards is generally conducted in a non-oxidizing atmosphere under normal pressure (actually under an atmosphere of inert gas at one atmosphere pressure). Sintering at low temperature proceeds more readily with decreasing particle diameter of the copper powder in the copper paste. However, in the case of a fine powder of an average particle diameter of smaller than 1 μm (submicron powder) obtained by the conventional wet reduction process, the particles actually tend to adhere (bond) or tangle in groups of several to several tens of particles to form coarse particles (compound particles measuring several 1 μm to several tens of μm in diameter). The powder therefore becomes one composed of intermixed compound particles and submicron particles (an agglomerated powder). When such a copper powder is sintered at a low temperature, any sintering that occurs proceeds only partially and the sintered product includes many pores. From this it follows that reduction of particle diameter alone is not sufficient for achieving a low sintering temperature.

As demonstrated by the Examples set out later, however, when the secondary reduction of the wet reduction process is promoted by the presence of ammonia or an ammoniate, the copper powder obtained, even if a fine powder of a particle diameter smaller than 1 μm, does not readily form coarse particles (is highly resistant to agglomeration) and enables production of a pseudo-fused sintered product with no or very few pores even when sintered at a temperature not higher than 800° C. The reason for this, while not completely verified, is thought to be that ammonia or ammoniate present in the solution acts as a complexing agent that causes the Cu to shift to the solution as a complex and since the reduction proceeds from this, smooth metallic copper particles of uniform diameter are produced. The ammonia or ammoniate can be added in the form of ammonia gas, ammonia water, ammonium hydroxide or any of various ammonium compounds and ammonium salts. Ammonia water is convenient for ease of handling. The amount added is preferably 0.01–0.1 mole, more preferably 0.02–0.08 mole, as ammonia per mole of copper in the system. In actual practice, the ammonia or ammoniate preferably remains in the solution at the time of completion of the reduction to metallic copper.

In order to reduce the average particle diameter of the metallic copper powder, the reducing agent used for the secondary reduction should be added at one time in not less than an equivalent amount. Taking the specific case of using hydrous hydrazine as the reducing agent, at least 1.1 times the chemical equivalent of hydrous hydrazine required for reducing the cuprous oxide to metallic copper should be added all at once. This enables production of a fine metallic copper powder having an average particle diameter in the range of 0.1–1.5 μm, preferably 0.3–1.2 μm. Moreover, by blowing an oxygen-containing gas into the suspension of cuprous oxide produced by the primary reduction, the particle diameter can be controlled in proportion to the amount of blown gas and the particle size distribution width can also be narrowed. Although the particle diameter increases with increasing amount of blown-in oxygen-containing gas, when the desired effect is to maintain a small particle diameter while narrowing the particle size distribution width a small overall amount of oxygen-containing gas is preferably blown in over an extended period.

Known methods can be used for the other processing steps. For instance, in the step of precipitating copper hydroxide, the aqueous solution of copper salt can be an aqueous copper sulfate solution used in the ordinary manner as, but an aqueous solution of copper chloride, copper carbonate, copper nitrate or the like is also usable. Although an aqueous solution of NaOH is most commonly used as the alkali, any of various other alkalis that have no effect on other aspects of the invention process can be used instead. The reaction for precipitating copper hydroxide can be conducted by the method of separately preparing an aqueous solution of copper salt of a certain concentration and an aqueous alkali solution of a certain concentration, mixing the two to prepare a solution containing excess alkali, and then immediately subjecting the solution to vigorous stirring. Otherwise it can be carried out by the method of continuously adding the aqueous alkali solution to the aqueous solution of a copper salt under stirring. Addition of a reducing agent to the obtained copper hydroxide suspension in order to reduce the copper hydroxide to cuprous oxide can be conducted by using a glucose as the reducing agent in the ordinary manner. This primary reduction step is preferably carried out under an inert gas atmosphere and increasing temperature (50–90° C.). The blowing-in of oxygen-containing gas, when conducted, can be carried out by bubbling air into the suspension.

After the final reduction to metallic copper by addition of hydrous hydrazine in the presence of ammonia or ammoniate, the metallic copper is separated from the suspension and dried, either immediately or after surface treatment for imparting oxidation resistance, to afford a metallic copper powder of small average particle diameter that exhibits little agglomeration.

The copper powder has an average particle diameter of from not less than 0.1 μm to less than 1.5 μm, preferably 0.3–1.2 μm. The number of particles of a particle diameter near the average particle diameter is great and the number of particles of a particle diameter far from the average particle diameter is small. Specifically, when the particle size distribution is measured by, for example, a helos particle size distribution measuring device, the copper powder is found to have a narrow particle size distribution width whose value A, defined by Equation (1) in terms of X25, X50 and X75, i.e., values of particle diameter X corresponding to Q %=25%, 50% and 75% (where Q % is the ratio of particles present of a diameter not greater than the corresponding value of X; expressed in units of vol % of particles), is not greater than 1.2, preferably not greater than 1.0:

$$A=(X75-X25)/X50 \quad (1),$$

on a cumulative particle-size curve plotted in an orthogonal coordinate system whose abscissa represents particle diameter X (μm) and ordinate represents Q % (see FIG. 1 relating to Examples set out below). In addition, the copper powder exhibits a low B.E.T specific surface area despite its small average particle diameter. In other words, it consists of smooth particles of minimal surface irregularity (see FIG. 2 relating to Examples set out below).

Figure 3:
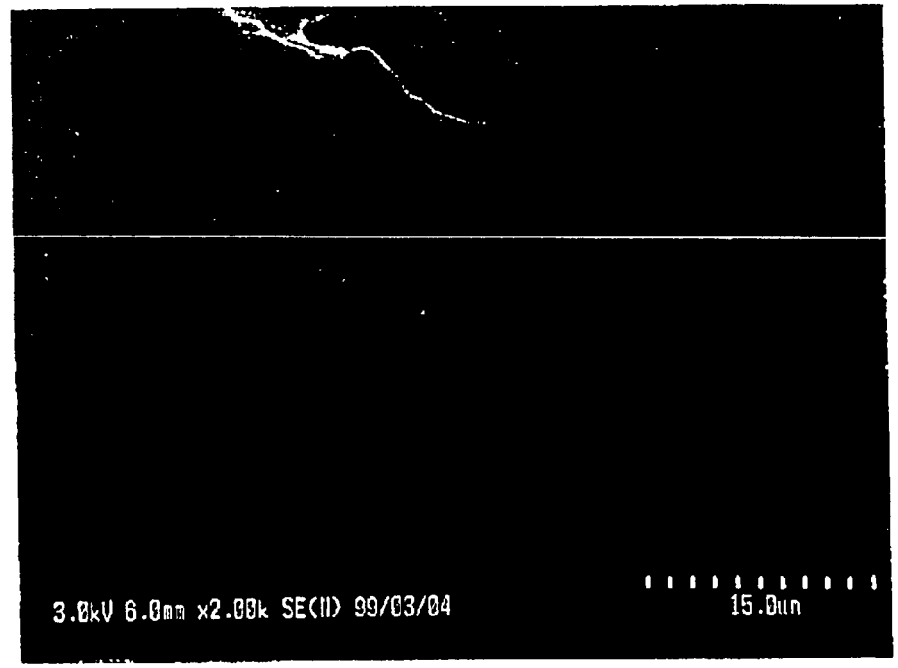
FIG. 3 is an SEM image of a sintered product obtained by sintering the copper powder according to this invention at 800° C.

Owing to its achievement of the aforesaid average particle diameter, value A, and surface smoothness (e.g., a small B.E.T. specific surface area of not more than 2.0 m²/g even at an average particle diameter of around 0.8 μm), the copper powder according to the present invention forms a pseudo-fused sintered product when held at a temperature of 800° C. under an atmosphere of inert gas at one atmosphere pressure (see FIG. 3 related to Examples set out below). In contrast, a copper powder whose average particle diameter falls within the range specified by the present invention but whose value A falls outside the range specified by the present invention forms a porous sintered product including pores when sintered at the same temperature of 800° C. (see FIG. 6, for example). Moreover, a copper powder whose value A falls within the range specified by the present invention but whose average particle diameter is larger than the upper limit of the range specified by the present invention does not sinter when held at 800° C. (see FIG. 8, for example).

Therefore, when a conductive paste utilizing the invention copper powder as filler is used to form the external electrodes of stacked boards for mounting electrodes at a low sintering temperature.

WORKING EXAMPLES

Example 1

An aqueous solution of copper sulfate A was prepared by dissolving 1.04 Kg of $CuSO_4.5H_2O$ in 2.54 Kg of pure water and an aqueous alkali solution B was prepared by adding 850 g of an aqueous solution of NaOH of 49% concentration to 3.2 Kg of pure water. The total amount of solution A and solution B, held at 29° C. and 27° C., respectively, were poured into a reaction vessel and stirred. A suspension of precipitated copper hydroxide was obtained whose temperature was increased to 36° C. by heat of the reaction.

A glucose solution prepared by dissolving 1.12 Kg of a glucose in 1.59 Kg pure water was added to the total amount of copper hydroxide suspension obtained. The solution rose to a temperature of 70° C. over a 30-min period following the addition and was maintained at this temperature for 30 min thereafter. The processing operations up to this point (i.e., the precipitation of copper hydroxide and its reduction to cuprous oxide) were conducted throughout under a nitrogen atmosphere.

Air was then bubbled into the suspension at a flow rate of 1 liter/min over a period of 200 min, whereafter the suspension was left standing in a nitrogen atmosphere for two days. The supernatant (pH 5.5) was then removed to harvest substantially the total amount of the precipitate. A suspension was prepared by adding 2.25 Kg of pure water to the precipitate.

To the suspension was added 20 wt % ammonia water in an amount of 2 wt % based on the weight of the suspension. This amount of ammonia addition corresponded to 0.04 mole of ammonia per mole of copper in the system. This made the pH of the suspension 10. After the suspension had been adjusted to 50° C., 130 g of hydrous hydrazine was added thereto all at one time. The temperature of the suspension was increased to 80° C. by heat generated up to completion of the reaction. Upon completion of the reaction, the suspension was subjected to solid-liquid separation and a copper powder was obtained by drying the harvested solid content at 110° C. under an inert gas atmosphere.

The average particle diameter of the copper powder measured using a sub-sieve siezer (SSS) was 0.8 μm. The B.E.T specific surface area was found to be 1.6 m²/g. An analysis showed oxygen content to be 0.16 wt % and carbon content to be 0.09 wt %.

The particle size distribution of the copper powder was determined using a helos particle size distribution measuring device (Helos H0780; Sympatic Co.,Ltd.). The results are shown in FIG. 1. Curve 1 in the drawing is a particle size distribution curve showing how distribution density (right vertical axis) varies as a function of particle diameter X (μm) (horizontal axis represented by logarithm scal). Curve 2 is cumulative particle size curve showing how Q % (left vertical axis) varies as a function of particle diameter X (μm) (horizontal axis). Q % represents the vol % of particles of not greater than particle diameter X (μm) present. As can be seen from Curve 2, the particle diameters X at Q % of 25%, 50% and 75% were X25=0.47, X50=0.77 and X75=1.08 μm. The value of A was therefore 0.79. The foregoing results are summarized in Table 1.

Figure 2:
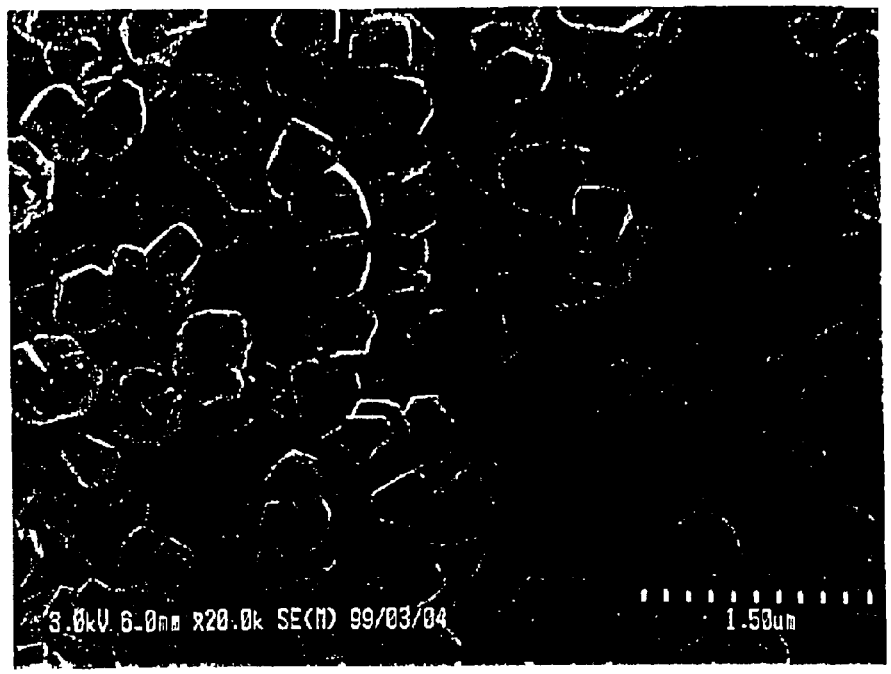
FIG. 2 is a scanning electron microscope (SEM) image of copper powder according to the present invention.

FIG. 2 is a scanning electron microscope (SEM) image of the copper powder of this Example. As can be seen, the copper powder was composed of smooth-surfaced particles of substantially equal diameters of around 0.8 μm.

30 g of the copper powder of this Example and 6 g of resin (ethyl cellulose: 95% +terpineol; 5%) were blended in a deaerating blender for 3 min. A 30 μm-thick coat of the blended material was applied to an aluminum board and dried for 3 hr at 100° C. in a nitrogen atmosphere. The dried product was sintered for 30 min at 800° C. in a nitrogen atmosphere (1 atmosphere). A scanning transmission electron microscope (SEM) image of the sintered body obtained is shown in FIG. 3. This image demonstrates that the copper powder of this Example formed a pseudo-fused sintered product at 800° C. In other words, a solid sintered product having substantially no pores and presenting a once-melted-down consistency was obtained at a sintering temperature 800° C.

Example 2

The process of Example 1 was repeated except that the amount of 20 wt % ammonia water added was changed to 1.5 wt % based on the weight of the suspension. This amount of ammonia addition corresponded to 0.03 mole of ammonia per mole of copper in the system. The properties of the copper powder obtained were determined in the same manner as in Example 1 and are also shown in Table 1. When the copper powder was sintered under the same conditions as in Example 1, there was obtained a pseudo-fused sintered product that, like that of Example 1, was substantially free of pores.

Example 3

The process of Example 1 was repeated except that the amount of 20 wt % ammonia water added was changed to 1.0 wt % based on the weight of the suspension. This amount of ammonia addition corresponded to 0.02 mole of ammonia per mole of copper in the system. The properties of the copper powder obtained were determined in the same manner as in Example 1 and are also shown in Table 1. When the copper powder was sintered under the same conditions as in Example 1, there was obtained a pseudo-fused sintered product that, like that of Example 1, was substantially free of pores.

Comparative Example 1

The process of Example 1 was repeated except that no addition of ammonia water was effected. The properties of the copper powder obtained were determined in the same manner as in Example 1 and are also shown in Table 1.

Figure 4:
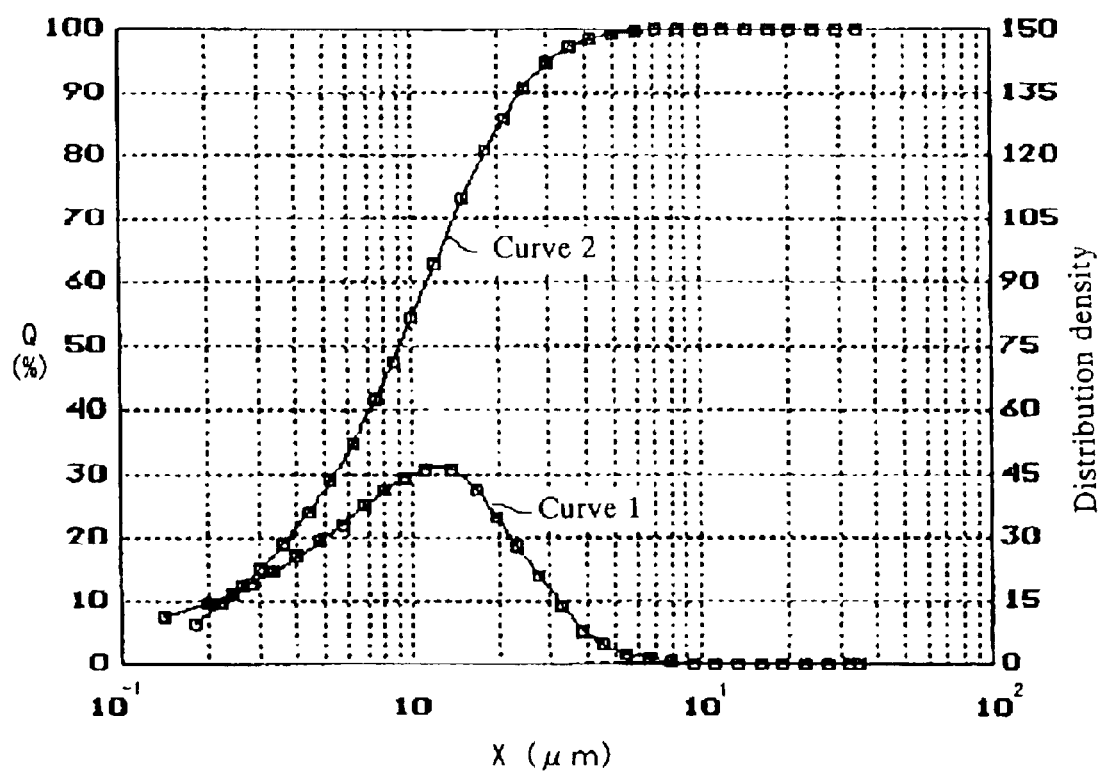
FIG. 4 is a helos particle-size distribution chart of a copper powder according to a comparative example.
Figure 5:
FIG. 5 is an SEM image of a copper powder according to a comparative example (particles of small diameter but agglomerated).
Figure 6:
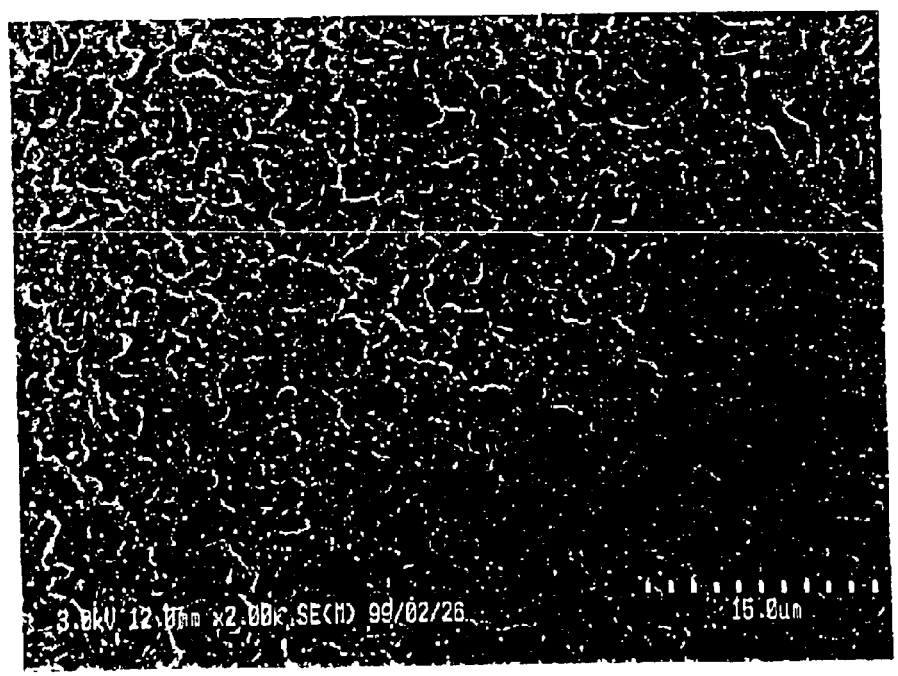
FIG. 6 is an SEM image of a sintered product obtained by sintering a copper powder according to a comparative example (particles of small diameter but agglomerated) at 800° C.

FIG. 4 shows a particle size distribution Curve 1 and a cumulative particle size Curve 2 based on the copper powder particle size distribution of the copper powder of this Comparative Example determined using a helos particle size distribution measuring device as in Example 1. FIG. 5 is an SEM image of the copper powder and FIG. 6 is an SEM image of a sintered product obtained by sintering the copper powder under the same conditions (800° C.) as in Example 1. As can be seen in FIG. 5, agglomeration of the copper powder had progressed to the point that it included many coarse particles consisting of several to several tens of adhered or tangled particles. As can be seen from FIG. 6, the agglomerated powder of this Comparative Example, when sintered at a temperature of 800° C., did not, despite its small average particle diameter, form a pseudo-fused sintered product with few pores like that in FIG. 1 but formed a sintered product that included many pores because the particles were only partially joined. Obviously such a product would have lower electrical conductivity than that of Example 1.

Comparative Example 2

The process of Comparative Example 1 was repeated except that air was bubbled at a flow rate of 7 liter/min over a period of 200 min. The properties of the copper powder obtained determined in the manner of Example 1 are also shown in Table 1.

Figure 7:
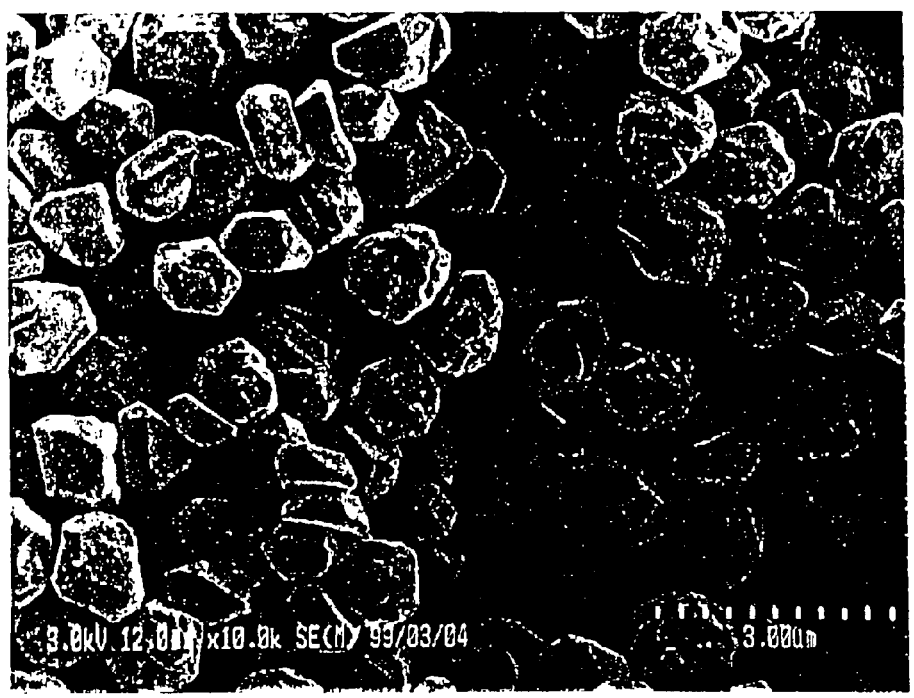
FIG. 7 is an SEM image of a copper powder according to a comparative example (particles not agglomerated but of large diameter).
Figure 8:
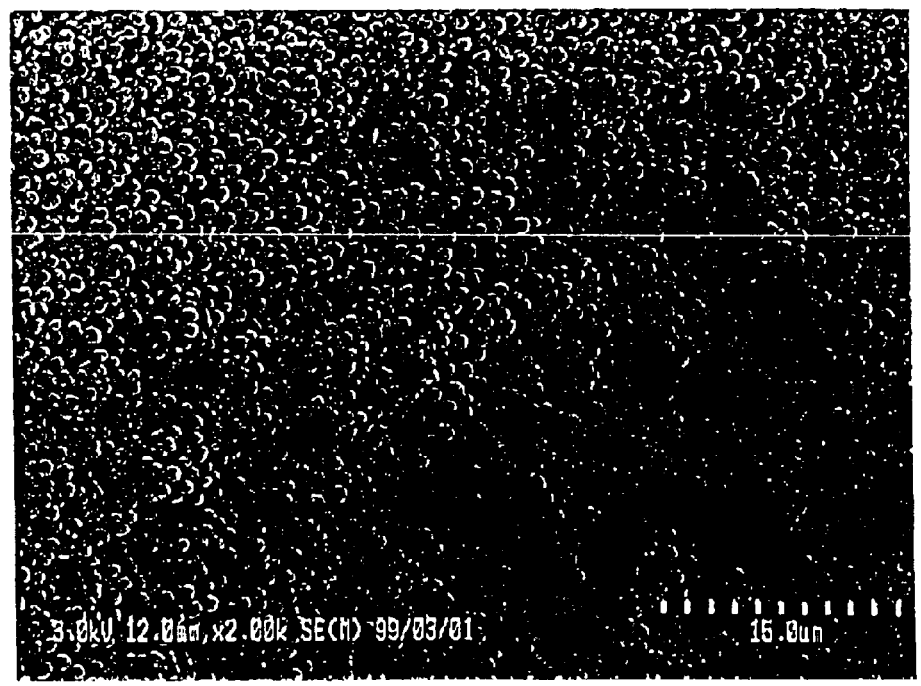
FIG. 8 is an SEM image of a sintered product obtained by sintering a copper powder according to a comparative example (particles not agglomerated but of large diameter) at 800° C.

FIG. 7 is an SEM image of the copper powder and FIG. 8 is an SEM image of a sintered product obtained by sintering the copper powder under the same conditions (800° C.) as in Example 1. As can be seen from FIG. 7, the copper powder of this Comparative Example was composed of large-diameter particles. (Note that the magnification in FIG. 7 is one-half that in FIGS. 2 and 5.) The particles did not agglomerate. As can be seen from FIG. 8, no sintering progressed at 800° C. in the case of the large-particle-diameter copper powder of this Comparative Example.

TABLE 1

| No | BET Value ($m^2$) | Average particle diameter SSS value ($\mu m$) | Oxygen content (%) | Carbon content (%) | Cumulative distribution of particle diameter ($\mu m$) | | | Value A (X75 − X25)/X50 |
|---|---|---|---|---|---|---|---|---|
| | | | | | X25 | X50 | X75 | |
| Example 1 | 1.6 | 0.8 | 0.16 | 0.09 | 0.47 | 0.77 | 1.08 | 0.79 |
| Example 2 | 1.7 | 0.8 | 0.17 | 0.08 | 0.45 | 0.80 | 1.12 | 0.84 |
| Example 3 | 2.0 | 0.8 | 0.15 | 0.08 | 0.46 | 0.79 | 1.20 | 0.94 |
| Comparative Example 1 | 2.8 | 0.6 | 0.25 | 0.14 | 0.45 | 0.91 | 1.58 | 1.48 |
| Comparative Example 2 | 0.8 | 1.5 | 0.21 | 0.07 | 1.00 | 1.30 | 1.70 | 0.53 |

As explained in the foregoing, the present invention provides a metallic copper powder that forms a pseudo-fused sintered product with few pores when sintered at 800° C. As the metallic copper powder has a property of sintering into a solid body, it is, for example, highly suitable for use in forming a sintered terminal electrode of multi-layer ceramics capacitors.

What is claimed is:

1. A copper powder prepared by a wet reduction process, said copper powder comprising particles having an average particle diameter in the range of from not less than 0.1 $\mu m$ to less than 1.5 $\mu m$, the powder having an oxygen content of 0.17% or less and having a narrow particle size distribution width whose value A, defined by equation below in terms of X25, X50 and X75 defined below is not greater than 1.2, and forms a pseudo-fused sintered product when held at a temperature of 800° C. under an atmosphere of inert gas at one atmosphere pressure:

$$A=(X75-X25)/X50$$

where X25, X50 and X75 are values of particle-size curve plotted in an orthogonal coordinate system whose abscissa represents particle diameter X ($\mu m$) and ordinate represents Q % (ratio of particles of a diameter not greater than the corresponding value of X; expressed in units of vol % of particles).

2. A copper powder according to claim 1 whose average particle diameter is in the range of 0.3–1.2 $\mu m$ and whose value A is not greater than 1.0.

3. A copper powder according to claim 1 utilized in forming a terminal electrode of a multi-layer ceramic capacitor by sintering the powder under heating an electrical conductive paste containing the powder.

* * * * *